May 22, 1951 D. H. SLOAN 2,554,272

SPLIT ANODE MAGNETRON WITH TUNING RING

Filed Oct. 31, 1945 2 Sheets-Sheet 1

WITNESSES:

Leon M. Garman

John R. Shipman

INVENTOR

David H. Sloan.

BY

F. W. Lyle.

ATTORNEY

SPLIT ANODE MAGNETRON WITH TUNING RING

Filed Oct. 31, 1945 2 Sheets-Sheet 2

WITNESSES:

Leon M. Garman

John L. Shipman

INVENTOR

David H. Sloan.

BY

F. W. Lyle.

ATTORNEY

Patented May 22, 1951 2,554,272

UNITED STATES PATENT OFFICE 2,554,272

SPLIT ANODE MAGNETRON WITH TUNING RING

David H. Sloan, Silver Spring, Md., assignor to Westinghouse Electric Corporation, East Pittsburgh, Pa., a corporation of Pennsylvania Application October 31, 1945, Serial No. 625,909

17 Claims. (Cl. 315—39)

This invention relates to an electronic tube apparatus and has particular relation to apparatus including a magnetron tube having a plurality of anode members, such as a magnetron of the split-anode type.

A magnetron of the split-anode type of the usual construction includes two semi-cylindrical anode members arranged to form a generally cylindrical anode structure about a coaxial filament or cathode in an axial magnetic field. The two anode members are included in an oscillatory circuit which is often entirely within the envelope of the tube. Magnetrons of the split-anode type operate quite satisfactorily, being employed usually as generators of high frequency oscillations, but heretofore the tuning range of such magnetrons has been quite limited. The limited tuning range limits, of course, the use which may otherwise be made of such magnetrons.

It is accordingly an object of my invention to provide a magnetron of the type having a plurality of anode members which includes an improved tuning arrangement.

Another object of my invention is to provide a magnetron of the type having a plurality of anode members with a novel tuning arrangement, permitting tuning of the oscillator circuit over a wide range.

A further object of my invention is to provide a magnetron of the type having a plurality of anode members with a novel wide range tuning arrangement which may be operated at will from a point outside the tube envelope.

In accordance with my invention, a magnetron of the type having at least one pair of anode members is provided in which each of the anode members has an inductive lead connected thereto. The inductive lead is included with the anode members in the oscillatory circuit of the magnetron in which the inductance of the leads and the capacitance between the pair of anode members are of primary importance. A tuning arrangement is then provided which includes a highly conductive tuning member movable to vary the anode capacity and the inductance of the leads to tune the oscillatory circuit. Preferably the inductive leads extend substantially parallel to the axis of the anode structure and the tuning member is a ring surrounding the anode structure and leads. The tuning ring is then movable in a direction parallel to the axis of the anode structure to vary simultaneously the inductance of the lead and the anode capacity. This arrangement greatly increases the tuning range.

The features of my invention which I consider novel are set forth with greater particularity in the accompanying claims. The invention itself, however, together with the additional objects and advantages thereof may be better understood from the following description of a specific embodiment when read in connection with the accompanying drawings, in which:

Figure 1:
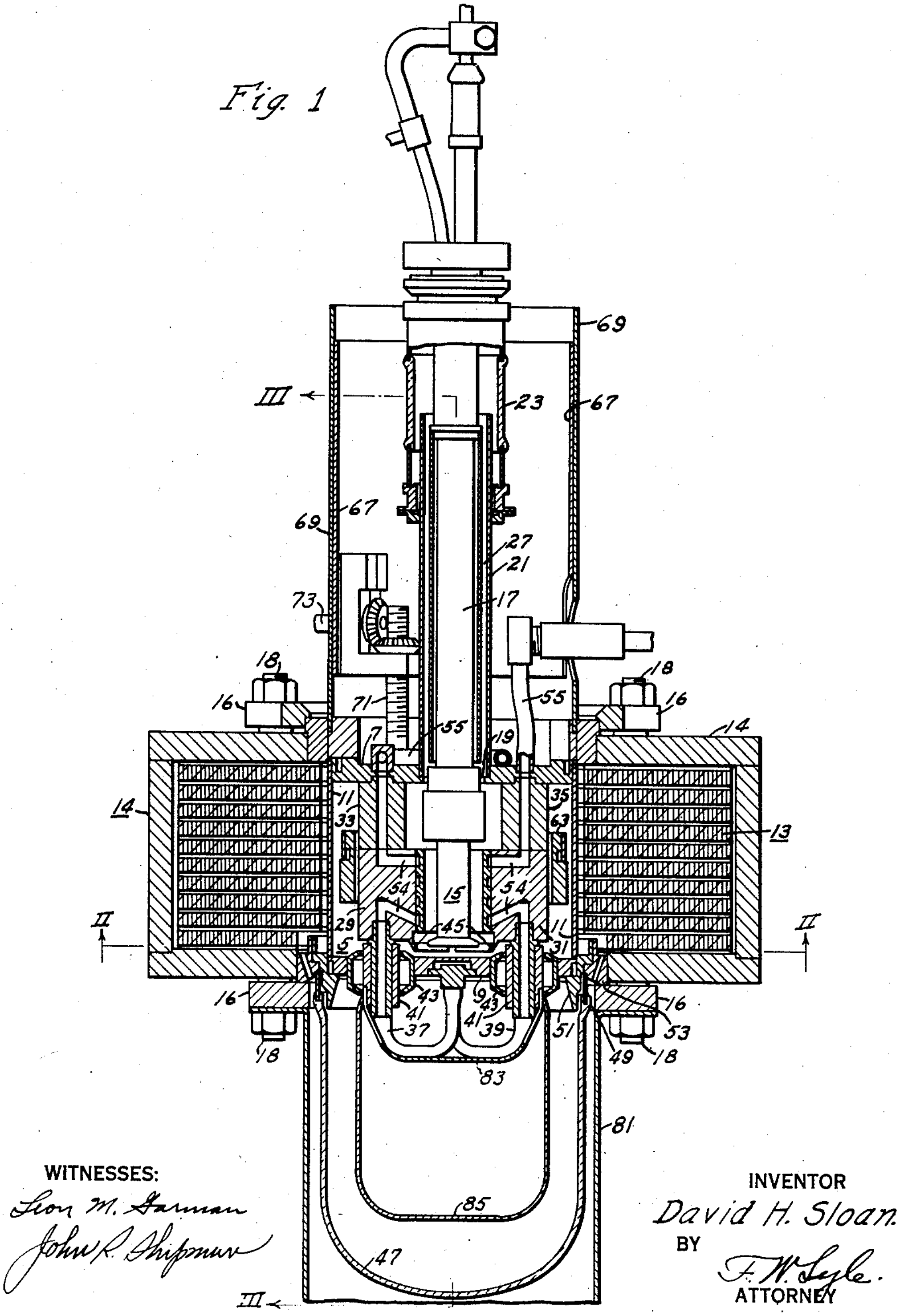
Figure 1 is a cross sectional view of apparatus including a magnetron of the split-anode type embodying the invention.

As shown in the drawings, the apparatus includes a cylindrical anode chamber 5 including a pair of end plates 7 and 9 of magnetic material, and a connecting cylindrical wall 11 between the pole pieces which is also of a magnetic material.

A magnet coil 13 having a shell 14 of magnetic material, such as iron, surrounds the cylindrical wall 11 of the anode chamber 5 with the end pieces 7 and 9 of the chamber cooperating with the shell 14 to act as pole pieces. The shell 14 and coil 13 are conveniently held together by plates 16 and bolts 18. Thus, a magnetic field is produced within and substantially parallel to the axis of the anode chamber between the end plates. The cylindrical wall 11 of the anode chamber, while of magnetic material is of such dimensions as to be readily saturable so that it does not distort the field within the chamber. This magnetic circuit arrangement is described in my copending application, Serial No. 625,910, filed October 31, 1945, which is now U. S. Patent #2,504,894, granted April 18, 1950.

A cylindrical cathode 15 is mounted coaxially within the anode chamber 5. The cathode 15 comprises a secondary emitter which is supported on a long stem 17 extending through an opening 19 in the upper end plate 7 and is connected to the end plate 7 by a tubular member 21 and a glass seal 23. The cathode 15 is arranged to be cooled by water or other suitable cooling fluid supplied through conduits within the stem 17.

To provide electrons to initiate operation of the magnetron, a small filament 25 is mounted on the cathode 15 to be heated to incandescence by current supplied through suitable leads also positioned within the stem 17. A quarter-wave length choke 27 is provided at the opening 19 in the upper end plate 7 through which the cathode stem 17 extends to prevent the escape of high frequency energy through the opening.

Figure 2:
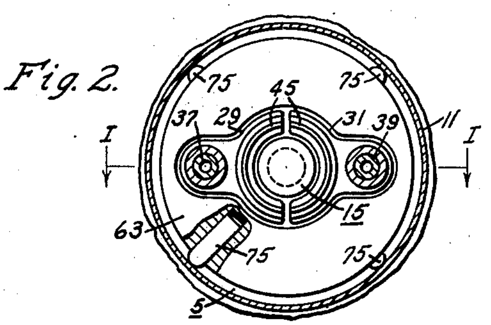
Fig. 2 is a partial view in section taken along II—II of Fig. 1.

The anode structure comprises a pair of anode members 29 and 31 of highly conductive material, such as copper, arranged to form a generally cylindrical structure about the cathode 15, as shown in Fig. 2, the inner surface of each anode member approximating a semi-cylinder. Each of the anode members 29 and 31 is supported by a corresponding conductive post 33 and 35, respectively, mounted on the upper end plate 7 of the anode chamber. These posts are arranged to provide a high inductance for the oscillatory circuit of the magnetron and are substantially parallel to the axis of the anode structure.

A pair of short high frequency leads in the form of tubes 37 and 39, preferably of copper, extend from the anode members 29 and 31, one tube from each anode member, through corresponding openings in the lower end plate 9 of the anode chamber 5 and form a pair of small coupling loops on the outside of the chamber 5 with the tubes 37 and 39 connected to the end plate 9 near the center thereof. Within the openings in end plate 9, a short sleeve of magnetic material 41 fits about each of the tubes 37 and 39 and a larger diameter sleeve 43 of magnetic material is secured at the edges of the openings. The larger sleeves 43 surround the corresponding sleeves 41 fitting about tubes 37 and 39 but are spaced therefrom. The ends of the larger diameter sleeves 43 while spaced from the corresponding sleeve 41 are bent inwardly and in cooperation with a small shield 45 on each of the anode members tend to prevent escape of electrons from the anode chamber through the openings in the end plate 9. A dome 47 of glass or other suitable material transparent to electromagnetic waves, surrounds the coupling loops and its base is sealed to a ring 49 of a suitable alloy having substantially the same coefficient of expansion as the glass. The ring 49 extends about the end plate 9 and is secured thereto through concentric rings 51 and 53. This arrangement provides a vacuum tight seal across the end plate 9.

The ends of tubes 37 and 39 which are connected to the end plate 9, open into opposite ends of a passage 50 within the end plate 9. The posts 33 and 35 are hollow and a passage 54 connecting therewith is also provided through each of the anode members 29 and 31 to the tubes 37 and 39. Suitable cooling fluid, such as water, may then be circulated from supply lines 55 connected to posts 33 and 35, through the posts, the anode members 29 and 31, the tubes 37 and 39 and end plate 9.

For purposes of convenience in manufacture, the anode members may be made of two parts with the cooling fluid passage extending therebetween as illustrated. In some cases, it may also be desirable to manufacture a supporting post and a corresponding anode member of a single piece of material rather than separate pieces as shown.

The magnet coil 13 is arranged to be cooled by air supplied under pressure through supply lines 57, the air passing through passages 59 provided throughout the coil 13 for cooling purposes. The seal at the junction of the glass dome 47 and the ring 49 may also be cooled by air flowing from the passages 59 within the magnet coil 13 out a plurality of conduits 61 in ring 53 which open at a point adjacent the seal.

Figure 3:
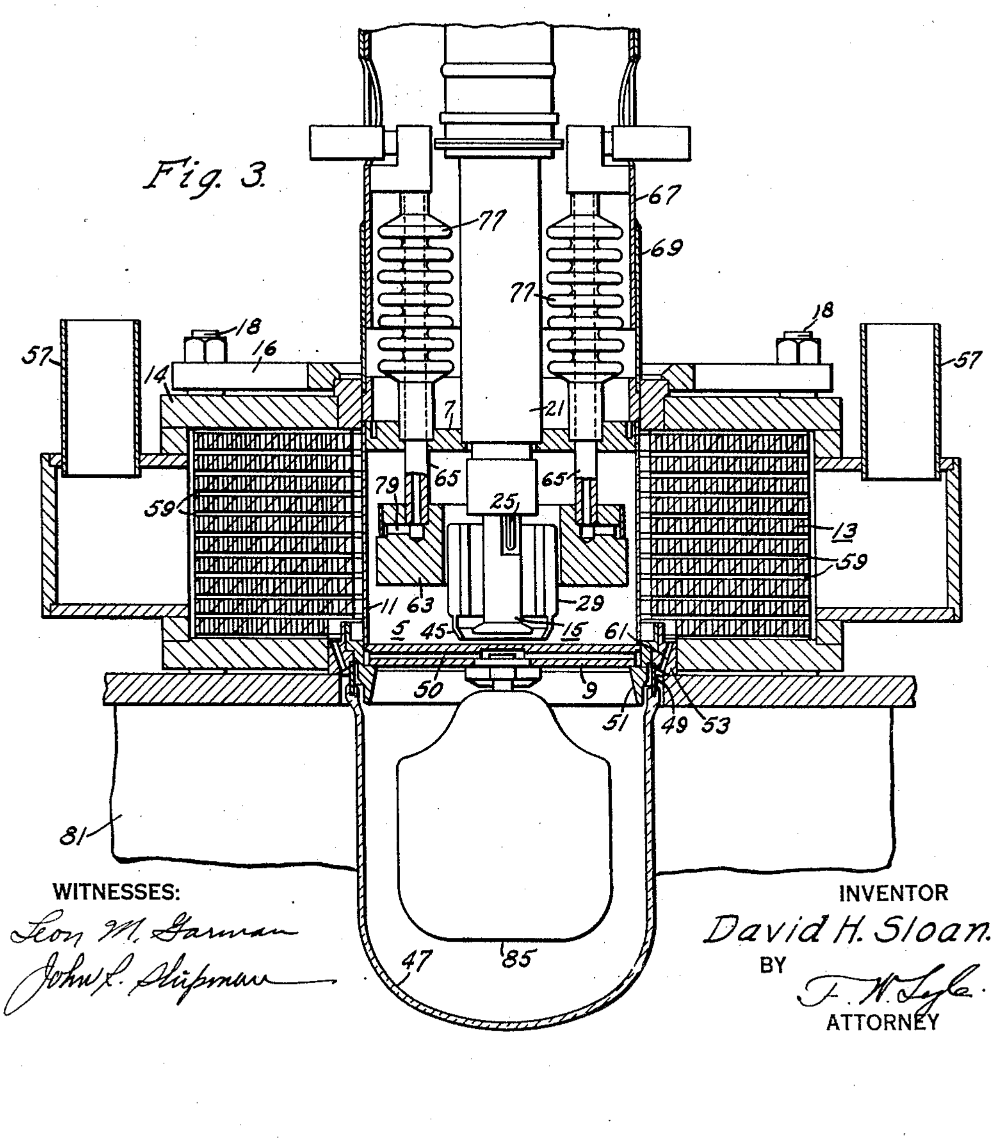
Fig. 3 is a sectional view of the tube apparatus taken along line III—III of Fig. 1, the section of Fig. 1 having been taken along the line of I—I of Fig. 2.

A tuning ring member 63 of conductive material, such as copper, surrounds the anode structure within the anode chamber 5. The tuning ring member 63 is supported on the ends of a pair of diagonally opposite pipes 65 which extend through the upper end plate 7 having a slide fit within the corresponding openings in the end plate as shown in Fig. 3. The pipes 65 are mounted on the sleeve 67 positioned within an outer housing 69 secured to the end plate 7. The sleeve 67 is, in turn, supported on a threaded post 71 mounted on the end plate 7 as shown in Fig. 1. The sleeve 67 is movable in a direction parallel to the axis of the anode chamber by means of a gear connection to the post 71 which is operable at will by rotation of a shaft 73 extending outside of the housing 69. As the sleeve 67 is moved up or down, the pipe supports 65 and the tuning ring member 63 are moved up or down, in a direction parallel to the axis of the anode structure. To aid in maintaining the tuning ring member 63 in proper axial relationship with the anode members 29 and 31, a plurality of spring biased pins 75 are provided within the tuning ring member as guides engaging the cylindrical wall 11 of the anode chamber 5, as shown in Fig. 2. The movement of the tuning ring member is preferably arranged so that in its extreme upper position, the tuning member is positioned about the posts 33 and 35; and in its lower position, it surrounds the anode members 29 and 31.

A metallic bellows 77 surrounds each pipe 65 outside of the anode chamber 5 and extends from the end plate 7 to the upper end of the corresponding pipe 65. Each end of the bellows is secured with a vacuum tight joint to permit movement of the pipes 65 while completing a vacuum tight space including the anode chamber 5 and the interior of the glass dome 41. This space is to be evacuated by means of a vacuum pump, not shown, which is associated therewith.

The tuning ring member 63 is also adapted to be cooled by cooling fluid supplied through the supporting pipes 65 and circulated through a passage 79 within the tuning ring member 63.

The outer surfaces of the anode members 29 and 31 are preferably substantially uniform in a direction parallel to the axis of the structure. With the posts 33 and 35 substantially parallel to the axis, the posts are preferably so positioned and the outer surface of the anode members have such a configuration, that a considerable portion, about two-thirds in the embodiment illustrated, of the surface of each post 33 and 35 forms, in effect, an extension of the outer surface of the corresponding anode member. The opening in the tuning ring member 63 then preferably has the same general configuration as the combined outer surfaces of the anode members, as shown in Fig. 2, and is arranged so that when the member 63 surrounds the anode members there is but a very small space, in a plane perpendicular to the axis, between the outer surfaces of the anode members and the inner surface of the tuning ring member. It follows that when the tuning ring member 63 is about the posts 33 and 35, the inner surface of the member 63 is closely adjacent to a considerable portion of the surface of each post.

As is well known, magnetrons of the split-anode type have an oscillatory circuit associated with the anode members, which circuit is fully or partially included as part of the magnetron itself. In the illustrated arrangement, the oscillatory circuit is included within the magnetron and comprises the supporting posts 33 and 35, the anode members 29 and 31 and tubes 37 and 39. In this circuit, the inductance of the posts 33 and 35 and the capacitance between the anode members 29 and 31 are of primary importance.

Now when the tuning ring member 63 is moved to its upper position about the posts 33 and 35, the ring member tends to obstruct an electro-magnetic field about each of the posts so that the inductance of the posts is relatively low. At the same time, the capacitance between the anode members is at a minimum as the tuning ring member is a maximum distance from the anode members. As a result, the circuit is tuned to resonance at a relatively high frequency. If the tuning ring member 63 is then moved to its lower position surrounding the anode members, the capacitance is obviously increased and at the same time the obstruction offered by the ring member to an electro-magnetic field at the posts is reduced so that the inductance of the oscillatory circuit is also increased. As a result, the circuit is tuned to resonance at a relatively low frequency. Any desired tuning between these two limits may be obtained by adjustment of the tuning ring member between these two positions. By this method of tuning, an extremely wide range may be obtained. In addition, this method of tuning gives an almost straight line frequency characteristic which is highly desirable. The arrangement has proved to be highly satisfactory in magnetrons actually constructed and operated, and has increased the tuning range over other arrangements in general use by as much as 50%.

As set forth in my copending application, the enclosure of magnetic material about the coil 13 and chamber 5 permits the positioning of a load device closely adjacent the chamber to be directly coupled to the oscillatory circuit. In the illustrated arrangement, the load is represented as a hollow rectangular wave guide 81 into which the glass dome 47 and the output coupling loops of tubes 37 and 39 project. This provides a direct magnetic coupling between the magnetron and guide which is free from intermediate lines or branch circuits.

A sheet metal shield 83 is connected across the outer ends of the coupling loops to reduce the inductance provided by those loops in the oscillatory circuit. To increase the coupling to the guide, a metal dome 85 is also provided about the output coupling loops to contribute a capacitive coupling to the electric field in the guide in proper phase to add to the magnetic coupling provided by the output coupling loops as also described in the aforesaid copending application.

While I have shown and described a specific embodiment of my invention, I am aware that many modifications may be made without departing from the spirit of the invention. I, therefore, do not intend to limit my invention to the specific embodiment disclosed.

I claim as my invention:

1. Apparatus comprising an inductive element the inductance of which is substantial at high frequencies, means forming a substantial capacitance connected in an oscillatory circuit with said inductive element, and a conductive tuning member surrounding said inductive element and movable with respect thereto from a position surrounding said inductive element to a position surrounding said means to vary the amount of obstruction offered by said member to an electromagnetic field about said element and thereby to vary the inductance of said element and effect tuning of said circuit.

2. Apparatus comprising an electronic tube including a pair of anode members spaced from each other, a support for one of said anode members, said support and anode members being included in a resonant network wherein the capacitance between said anode members and the inductance provided by said support are of substantial importance at high frequencies, and a conductive tuning member adjacent said support and separated therefrom and movable with respect thereto to vary the amount of obstruction offered by said tuning member to an electromagnetic field about said support and thereby to vary the inductance provided by said support and effect tuning of said circuit, said tuning member being insulated from said anode members and said support.

3. Apparatus comprising an electronic tube including a vacuum tight envelope, a pair of anode members spaced from each other within said envelope, an inductive element, the inductance of which is substantial at high frequencies, connected to one of said anode members within said envelope, said element and anode members being included in a resonant network in which the inductance of said element and the capacitance between said anode members are of substantial importance, a conductive tuning member within said envelope adjacent said element but separated from said element, and movable with respect thereto to vary the amount of obstruction offered by the tuning member to an electromagnetic field about said element and thereby to vary the inductance of said element, and means operable from outside said envelope for moving said tuning member to effect tuning of said oscillatory circuit.

4. Apparatus comprising an electronic tube including a pair of anode members spaced from each other, a support for each of said anode members, said supports and anode members being included in a resonant network wherein the capacitance between said anode members and the inductance provided by said supports are of substantial importance at high frequencies, and a single conductive tuning member adjacent both said supports but separated from said supports and offering an obstruction to an electromagnetic field about each support, said tuning member being movable with respect to said support to vary the amount of obstruction offered and thereby vary the inductance of said supports to effect tuning of said circuit, said tuning member being insulated from said supports and said anode members.

5. Apparatus comprising an inductive element the inductance of which is substantial at high frequencies, a pair of spaced anode members connected with said element in a resonant network wherein the inductance of said element and the capacitance between said anode members are of substantial importance, and a conductive tuning member adjacent said anode members and said inductive element whereby said tuning member affects substantially both the inductance of said element and the capacitance between said anode members, said tuning member being movable with respect to said anode members and element to vary simultaneously said inductance and capacitance.

6. Apparatus comprising an inductive element the inductance of which is substantial at high frequencies, a pair of spaced anode members connected with said element in a resonant network wherein the inductance of said element and the capacitance between said anode members are of substantial importance, and a conductive tuning member adjacent said element and said anode members and movable between a position closely adjacent said anode members and more remote from said element, whereby both the capacitance and the inductance are at a maximum, and another position closely adjacent said element and more remote from said anode members whereby both the capacitance and the inductance are at a minimum.

7. Apparatus comprising an electronic tube including a vacuum tight envelope having therein an inductive element the inductance of which is substantial at high frequencies, a pair of spaced anode members adapted to be connected with said element in an oscillatory circuit wherein the inductance of said element and the capacitance between said anode members are of substantial importance, and a conductive tuning member adjacent said element and anode members and movable between a position closely adjacent said anode members and more remote from said element, where both the capacitance and the inductance are at a maximum, and another position closely adjacent said element and more remote from said anode members whereby both the capacitance and the inductance are at a minimum, and means operable from outside said envelope for moving said tuning member at will to effect tuning of said circuit.

8. Apparatus comprising a pair of spaced anode members positioned oppositely about an axis, an inductive element the inductance of which is substantial at high frequencies connected to an end of one of said anode members and extending away therefrom substantially parallel to said axis, said element and anode members being included in a resonant network wherein the inductance of said element and capacitance between said anode member is of substantial importance, and a conductive ring coaxial with and surrounding said anode members to increase the capacitance therebetween, said ring being movable in an axial direction to a position surrounding said element whereby to decrease the inductance of said element and simultaneously decrease said capacitance.

9. Apparatus comprising a pair of spaced anode members positioned oppositely about an axis, a support for each of said anode members extending from an end thereof away from the anode member substantially parallel to said axis, said supports extending from corresponding ends of the anode members, said supports and anode members being included in a resonant network wherein the inductance provided by said supports and the capacitance between said anode members is of substantial importance at high frequencies, and a conductive ring coaxial with and surrounding said anode members to increase the capacitance therebetween, said ring being movable in an axial direction to a position surrounding both said supports whereby to decrease the inductance provided by said supports and simultaneously decrease said capacitance.

10. Apparatus comprising a pair of spaced anode members positioned oppositely about an axis, a support for each of said anode members extending from an end thereof away from the anode member substantially parallel to said axis, said supports extending from corresponding ends of the anode members with each said support having a portion of its surface forming, in effect, an extension of the outer surface of the corresponding anode member, said supports and anode members being included in a resonant network wherein the inductance provided by said supports and the capacitance between said anode members is of substantial importance at high frequencies, and a conductive ring coaxial with and surrounding said anode members with the inner surface of said ring closely adjacent the outer surfaces of said anode members whereby the capacitance between said anode members is increased, said ring being movable in an axial direction to a position surrounding both said supports whereby to decrease the inductance provided by said supports and simultaneously decrease said capacitance.

11. Apparatus comprising an electronic tube including a vacuum tight envelope having therein a pair of spaced anode members positioned oppositely about an axis, a support for each of said anode members extending from an end thereof away from the anode member substantially parallel to said axis, said supports extending from corresponding ends of the anode members, said supports and anode members being included in a resonant network wherein the inductance provided by said supports and the capacitance between said anode members is of substantial importance at high frequencies, and a conductive ring coaxial with and surrounding said anode members to increase the capacitance therebetween, said ring being movable in an axial direction to a position surrounding both said supports whereby to decrease the inductance provided by said supports and simultaneously decrease said capacitance, and means operable from outside said envelope for moving said ring at will to effect tuning of said circuit.

12. Apparatus comprising a pair of spaced anode members positioned oppositely about an axis, a support for each of said anode members extending from an end thereof away from the anode members substantially parallel to said axis, said supports extending from corresponding ends of the anode members with the outer surface of each anode member and each support being substantially uniform in an axial direction, the configuration of a part of the outer surface of each anode member in a plane perpendicular to said axis being the same as at least half of the outer surface of the corresponding support with each support positioned so that the surface thereof of said same configuration forms in effect an extension of said part of the outer surface of the corresponding anode member, said supports and anode members being included in a resonant network wherein the inductance provided by said supports and the capacitance between said anode members is of substantial importance at high frequencies, and a conductive ring coaxial with and surrounding said anode members with the inner surface of said ring closely adjacent to the outer surfaces of said anode members, whereby the capacitance between said anode members is increased, said ring being movable in an axial direction to a position surrounding both said supports whereby to decrease the inductance provided by said supports and simultaneously decrease said capacitance.

13. Apparatus comprising a pair of spaced anode members positioned oppositely about an axis, a metallic element connected to an end of one of said anode members and extending away therefrom substantially parallel to said axis, said element and anode members being included in a resonant network, and a conductive ring coaxial with and surrounding said anode members to increase the capacitance therebetween, said ring being movable in an axial direction.

14. Apparatus comprising a pair of spaced anode members positioned oppositely about an axis, a support for each of said anode members extending from an end thereof away from the anode member substantially parallel to said axis, said supports extending from corresponding ends of the anode members, said supports and plate members being included in a resonant network, and a conductive ring coaxial with and surrounding said anode members to increase the capacitance therebetween, said ring being movable in an axial direction to a position surrounding both said supports.

15. Apparatus comprising a pair of spaced anode members positioned oppositely about an axis, a support for each of said anode members extending from an end thereof away from the anode member substantially parallel to said axis, said supports extending from corresponding ends of the anode members with each said support having a portion of its surface forming, in effect, an extension of the outer surface of the corresponding anode member, said supports and anode members being included in a resonant network, and a conductive ring coaxial with and surrounding said anode members with the inner surface of said ring closely adjacent the outer surfaces of said anode members whereby the capacitance between said anode members is increased, said ring being movable in an axial direction to a position surrounding both said supports.

16. Apparatus comprising an electronic tube including a vacuum tight envelope having therein a pair of spaced anode members positioned oppositely about an axis, a support for each of said anode members extending from an end thereof away from the anode member substantially parallel to said axis, said supports extending from corresponding ends of the anode members, said supports and anode members being included in a resonant network, and a conductive ring coaxial with and surrounding said anode members to increase the capacitance therebetween, said ring being movable in an axial direction, and means operable from outside said envelope for moving said ring at will to effect tuning of said circuit.

17. Apparatus comprising a pair of spaced anode members positioned oppositely about an axis, a support for each of said anode members extending from an end thereof away from the anode members substantially parallel to said axis, said supports extending from corresponding ends of the anode members with the outer surface of each anode member and each support being substantially uniform in an axial direction, the configuration of a part of the outer surface of each anode member in a plane perpendicular to said axis being the same as at least half of the outer surface of the corresponding support with each support positioned so that the surface thereof of said same configuration forms in effect an extension of said part of the outer surface of the corresponding anode member, said supports and anode members being included in a resonant network, and a conductive ring coaxial with and surrounding said anode members with the inner surface of said ring closely adjacent to the outer surfaces of said anode members whereby the capacitance between said anode members is increased, said ring being movable in an axial direction.

DAVID H. SLOAN.

REFERENCES CITED

The following references are of record in the file of this patent:

UNITED STATES PATENTS

| Number | Name | Date |
|---|---|---|
| 1,610,316 | Quilter | Dec. 14, 1926 |
| 1,613,948 | Hartley | Jan. 11, 1927 |
| 2,115,521 | Fritz et al. | Apr. 26, 1938 |
| 2,144,222 | Hollmann | Jan. 17, 1939 |
| 2,163,589 | Dallenbach | June 27, 1939 |
| 2,167,201 | Dallenbach | July 25, 1939 |
| 2,400,753 | Haeff | May 21, 1946 |
| 2,408,234 | Spencer | Sept. 24, 1946 |
| 2,414,084 | Bowen | Jan. 14, 1947 |
| 2,424,496 | Nelson | July 22, 1947 |
| 2,428,193 | Blewett | Sept. 30, 1947 |
| 2,504,894 | Sloan | Apr. 18, 1950 |